United States Patent
Higgins (10) Patent No.: US 9,775,457 B2
(45) Date of Patent: *Oct. 3, 2017

(54) FLOOR COVERING WITH UNIVERSAL BACKING AND METHODS OF MAKING AND RECYCLING

(71) Applicant: Higgins Research & Development, LLC, LaGrange, GA (US)

(72) Inventor: Kenneth B. Higgins, LaGrange, GA (US)

(73) Assignee: Higgins Research & Development, LLC, LaGrange, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/372,465

(22) Filed: Dec. 8, 2016

(65) Prior Publication Data

US 2017/0089007 A1 Mar. 30, 2017

Related U.S. Application Data

(63) Continuation-in-part of application No. 15/155,348, filed on May 16, 2016, now Pat. No. 9,681,768,
(Continued)

(51) Int. Cl.
*A47G 27/02* (2006.01)
*B05D 1/40* (2006.01)
(Continued)

(52) U.S. Cl.
CPC .............. *A47G 27/02* (2013.01); *B05C 3/18* (2013.01); *B05C 11/023* (2013.01);
(Continued)

(58) Field of Classification Search
CPC .............. A47G 27/02; A47G 27/0212; A47G 27/0243; A47G 27/025; A47G 27/0281;
(Continued)

(56) References Cited

U.S. PATENT DOCUMENTS 3,669,779 A 6/1972 Gordon
3,684,600 A 8/1972 Smedberg
(Continued)

FOREIGN PATENT DOCUMENTS

EP 0372105 A1 6/1990
GB 1220387 A 1/1971
(Continued)

*Primary Examiner* — Michael Tolin
(74) *Attorney, Agent, or Firm* — Hammer & Associates, P.C.

(57) ABSTRACT

A dimensionally stable universal floor covering includes a tufted textile substrate and a reinforcement layer to provide dimensional stability for the entire floor covering. Vacuum, mixing, and injection of compressed air assists in preparing an adhesive and fiber composition to be in the preferred condition and position before the application of pressure to form the reinforcement layer. The universal floor covering is selectively cut and transported in a roll for installation, and it can be conveniently recycled if necessary.

15 Claims, 10 Drawing Sheets

Related U.S. Application Data which is a continuation-in-part of application No. 15/098,509, filed on Apr. 14, 2016, now Pat. No. 9,506,175, which is a continuation of application No. 14/090,190, filed on Nov. 26, 2013, now Pat. No. 9,339,136.

(60) Provisional application No. 61/797,496, filed on Dec. 10, 2012.

(51) Int. Cl.
| | |
|---|---|
| *B32B 27/12* | (2006.01) |
| *D05C 17/02* | (2006.01) |
| *D06N 7/00* | (2006.01) |
| *B05C 3/18* | (2006.01) |
| *B05C 11/02* | (2006.01) |
| *B32B 37/10* | (2006.01) |
| *B32B 37/12* | (2006.01) |
| *B32B 37/14* | (2006.01) |
| *B32B 37/24* | (2006.01) |
| *B32B 38/00* | (2006.01) |

(52) U.S. Cl.
CPC ............. *B05C 11/025* (2013.01); *B05D 1/40* (2013.01); *B32B 27/12* (2013.01); *D05C 17/02* (2013.01); *D05C 17/023* (2013.01); *D06N 7/0071* (2013.01); *D06N 7/0073* (2013.01); *B32B 37/1018* (2013.01); *B32B 37/1284* (2013.01); *B32B 2037/148* (2013.01); *B32B 2037/243* (2013.01); *B32B 2038/0072* (2013.01); *B32B 2305/188* (2013.01); *B32B 2307/734* (2013.01); *B32B 2471/02* (2013.01); *D06N 7/0081* (2013.01); *D06N 2201/0254* (2013.01); *D06N 2203/061* (2013.01); *D06N 2205/14* (2013.01); *D06N 2209/1628* (2013.01); *D06N 2211/066* (2013.01); *D06N 2213/065* (2013.01); *D10B 2503/041* (2013.01); *Y10T 156/10* (2015.01); *Y10T 428/23979* (2015.04); *Y10T 428/23986* (2015.04); *Y10T 428/23993* (2015.04)

(58) Field of Classification Search
CPC ........ A47G 27/0293; B05C 1/04; B05C 1/14; B05C 3/18; B05C 11/023; B05C 11/025; B05D 1/40; B29C 2793/0054; B32B 27/12; B32B 37/1018; B32B 37/1284; B32B 37/24; B32B 2037/148; B32B 2037/243; B32B 38/0004; B32B 38/10; B32B 2038/0072; B32B 43/003; B32B 2307/734; B32B 2471/02; C09J 103/00; C09J 129/04; C09J 167/00; C09J 2205/302; D05C 17/02; D06N 7/0071; D06N 7/0073; D06N 7/0076; D06N 7/0078; D06N 7/0081; D06N 7/0086; D06N 7/0089; D06N 2205/14; D06N 2209/1607; D06N 2209/1621; D06N 2213/03; D06N 2213/065; D06N 2213/068; D10B 2503/041; D10B 2503/042; Y10T 156/1082; Y10T 156/1111; Y10T 428/23979; Y10T 428/23986; Y10T 428/23993

See application file for complete search history.

(56) References Cited

U.S. PATENT DOCUMENTS

| | | | | |
|---|---|---|---|---|
| 4,571,353 A | * | 2/1986 | Gable, Jr. | .......... A47G 27/0293 404/41 |
| 4,978,402 A | | 12/1990 | Hallworth | |
| 5,902,663 A | * | 5/1999 | Justesen | .................... B32B 7/12 428/95 |
| 6,428,873 B1 | * | 8/2002 | Kerr | ........................ A46B 5/06 428/337 |
| 7,182,989 B2 | * | 2/2007 | Higgins | ............. A47G 27/0293 428/44 |
| 7,351,465 B2 | | 4/2008 | Jerdee et al. | |
| 7,638,008 B2 | * | 12/2009 | Hamrick | ................... B32B 7/12 156/324 |
| 7,803,446 B2 | | 9/2010 | Martz | |
| 2002/0039636 A1 | | 4/2002 | Fink et al. | |
| 2004/0079467 A1 | | 4/2004 | Brumbelow et al. | |
| 2004/0197522 A1 | | 10/2004 | Reisdorf et al. | |
| 2005/0037175 A1 | | 2/2005 | Loyd et al. | |
| 2007/0224420 A1 | | 9/2007 | Despins | |
| 2008/0274307 A1 | * | 11/2008 | Chereau | .................. B32B 27/12 428/17 |
| 2010/0170991 A1 | | 7/2010 | Hobbs et al. | |
| 2011/0039056 A1 | | 2/2011 | Mantle et al. | |
| 2014/0158276 A1 | * | 6/2014 | Higgins | ............. A47G 27/0212 156/60 |
| 2015/0299947 A1 | * | 10/2015 | Brumbelow | ......... D06N 7/0076 428/95 |

FOREIGN PATENT DOCUMENTS

| | | | |
|---|---|---|---|
| GB | 1366341 A | * | 9/1974 |
| JP | 06-343542 A | | 12/1994 |
| WO | WO 94/02678 A1 | | 2/1994 |

* cited by examiner

FLOOR COVERING WITH UNIVERSAL BACKING AND METHODS OF MAKING AND RECYCLING

CROSS REFERENCE TO RELATED APPLICATIONS

The present invention is a continuation-in-part of and claims priority to U.S. application Ser. No. 15/155,348 filed May 16, 2016, now U.S. Pat. No. 9,681,768, which is a continuation-in-part of U.S. application Ser. No. 15/098,509 filed Apr. 14, 2016, now U.S. Pat. No. 9,506,175, which is a continuation of U.S. application Ser. No. 14/090,190 filed Nov. 26, 2013, now U.S. Pat. No. 9,339,136, which claims priority to U.S. Provisional Application No. 61/797,496 filed Dec. 10, 2012, the disclosures of which are incorporated by reference herein in their entirety.

TECHNICAL FIELD

The present disclosure is directed to the field of textile floor coverings, such as broadloom carpet and modular carpet tiles, and particularly to a textile floor covering with a fiber-reinforced polymer backing. More particularly, according to one or more aspects provided herein, the present disclosure is directed to a floor covering including a tufted textile substrate and a universal backing system and to methods of making, installing, and recycling such a floor covering.

BACKGROUND

With the advent of tufting equipment, floor covering evolved over time from woven carpet to the tufted carpets in use today. Machine tufting began with a single needle which was similar to a sewing machine. A needle carries a yarn through a primary backing substrate, which forms a stitch on the back side adjacent the primary backing substrate. On the face side, a looper holds the yarn to a specified height above the primary backing substrate to form the pile of the carpet. The tufted yarns and the primary backing substrate collectively are referred to as a tufted textile substrate.

The single needle configuration progressed to multiple needles operating side-by-side, which is how tufted carpets are made currently. Tufting widths of up to sixteen feet are possible with this equipment, and when sold at these widths, these carpets are referred to in the industry as "broadloom" carpets. This type of carpet is the preferred flooring material for today's residential homes and commercial buildings.

Modular carpet products (carpet tiles) were introduced to address some of the problems encountered with the broadloom carpet product. Because individual tiles of an installation can be removed and replaced when soiled or worn, modular carpets were useful in applications where broadloom carpets were impractical, such as offices, airports, and other high-traffic areas.

Both broadloom and tile carpet designs have faced challenges and issues with stability. Without a separate reinforced floor covering and/or one or more secondary backing layers, the broadloom carpet design has the tendency to "creep" leading to undesirable growth. Modular tiles with their heavy backing layers are stiff. As a result, there is a tendency for the modular tiles to cup or curl. Other challenges for modular tiles and broadlooms occur because of issues relating to thickness and weight variation.

In today's carpeting designs, it is practically impossible to separate and recycle the different chemical compositions and components of the multiple backing layers and preformed reinforcement layers from the yarns because of the bonding and use of multiple layers being made of disparate materials. In addition, the manufacturers of floor coverings have significant material costs and expensive manufacturing or processing steps relating to the multiple backing layers, preformed reinforcement layers, and the disparate materials.

With respect to stability, it is known in the carpet industry that the machine direction of a carpet is the greatest contributor to dimensional stability problems. The "machine direction" is considered to be the direction in which the yarn is tufted. The yarns, which form a continuous series of loops in the machine direction, are inherently unstable especially when exposed to heat and/or moisture. Additionally, the primary backing substrates tend to experience more shrinkage in the machine direction of the floor covering. Thus, the machine direction is almost always the more unstable direction of the floor covering.

There has been a need for a dimensionally stable floor covering of lower cost which may be used as a broadloom product or any variety of modular products. While the related patent applications referred to previously disclose a novel and unique universal carpet having a reinforcing backing layer, distinct and advantageous innovations and discoveries enhancing and improving the universal carpet invention will be disclosed and claimed herein.

SUMMARY

The related patent applications are directed to a dimensionally stable floor covering with a universal fiber-reinforced backing. The floor covering may be used in broadloom products or any of a variety of modular products. The manufacturing method and resulting product includes a tufted textile substrate having a primary backing substrate and a plurality of yarns tufted through the primary backing substrate. The primary backing substrate includes a face side and a back side opposite the face side and a portion of each yarn forming a stitch located on the back side of the primary backing substrate.

The manufacturing method and resulting product includes forming a wet-laid continuous overlapping reinforcement layer of fibers that is substantially parallel to the machine direction thereby providing dimensional stability to the floor covering. The manufacturing method and product also provide other advantages including permitting the same primary backing substrate to be used for all types of floor covering products thereby simplifying the manufacturing processes and reducing costs by eliminating the current requirement for pre-formed reinforcement layers.

Pressure is applied in a controlled manner between an applicator and the tufted textile substrate to move an adhesive and reinforcement fiber composition in a direction that is toward the back side of the primary backing substrate. During the application of pressure to the composition and the movement of the tufted textile substrate, the fibers are aligned to lay predominately in the machine direction. The manufacturing method also provides in situ filtration of the adhesive and reinforcement fibers such that the adhesive is separated from the reinforcement fibers. Adhesive is pushed into the interstitial spaces between the yarns, and the fibers are filtered away from the adhesive. A wet-laid continuous, overlapping reinforcement layer of fibers is formed that is substantially parallel to the direction of movement of the tufted textile substrate thereby providing dimensional stability for the entire floor covering.

The present invention is directed to the foregoing method of manufacturing a dimensionally stable floor covering. The present invention also includes the following:

a. a selection method for the tufting yarn, primary backing substrate, reinforcement fibers, and adhesive for providing the desired characteristics to be exhibited by the universal broadloom and modular carpeting;

b. a selection method of the equipment arrangement for applying adhesive and reinforcement fibers to a tufted textile substrate;

c. conditioning the adhesive and fibers by selective mixing of the reinforcement fibers in the adhesive and/or injection of compressed air into the adhesive and reinforcement fibers to assist in preparing the adhesive and reinforcement fiber composition to be in the preferred and desired condition and location;

d. selective use of vacuum to insure the desired movement of the adhesive or fibers, including, for example, movement of adhesive into the bodies of the stitch portions of the yarns or into the back side of the primary backing substrate, and, for example, movement of fibers into the spaces between the stitch portions before the applicator applies pressure to the tufted textile substrate;

e. selective use, movement, and configuration of an applicator arrangement to achieve the desired characteristics and design for the universal carpeting;

f. control of the pressure applied by the applicator and speed of movement by the tufted textile substrate to produce the desired universal carpet for either broadloom or modular products;

g. controlled cutting of the universal broadloom and modular carpeting in a roll for transporting and installation; and h. recycling the universal carpeting, if necessary, such that only cleaned tufted carpet and loose reinforcement fibers remain.

These and other features and advantages of the present invention will be better understood with reference to the following description and appended claims. The accompanying drawings, which constitute a part of the present specification, illustrate various embodiments of the invention and, together with the written description, serve to explain the principles of the inventive products and methods.

BRIEF DESCRIPTION OF THE DRAWINGS

A full and enabling disclosure of the present products and methods, including the best mode thereof, directed to one of ordinary skill in the art, is set forth in the specification, which makes reference to the appended figures, in which.

The cross-sectional views depicted in the FIGURES are views taken along the machine direction of the product (i.e. in the direction along which the carpet product is tufted and coated).

DETAILED DESCRIPTION

Reference will now be made in detail to embodiments of the inventive products and methods, one or more examples of which are illustrated in the drawings. Each example is provided by way of explanation of the invention and not a limitation of the invention. It will be apparent to one of ordinary skill in the art that various modifications and variations can be made in the present invention without departing from the scope or spirit of the invention. Thus, it is intended that the present invention covers such modifications and variations as fall within the scope of the appended claims and their equivalents.

Figure 1:
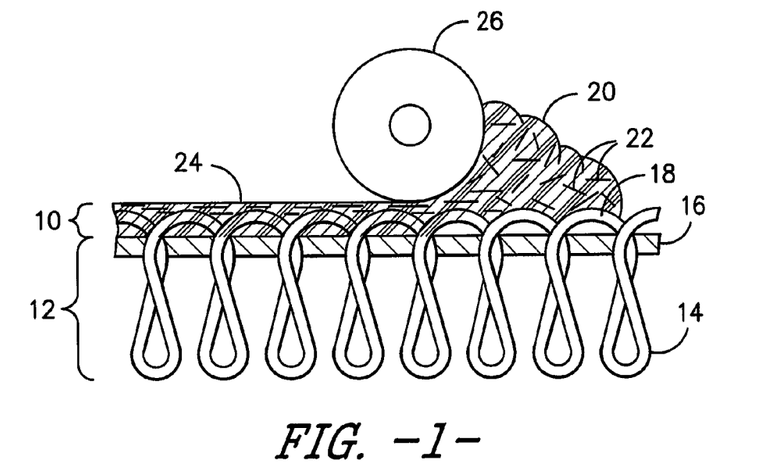
FIG. 1 is a schematic diagram of an equipment arrangement for applying an adhesive layer and reinforcing fibers to a tufted textile substrate, as may be used in the production of the inventive floor covering products described herein.

FIG. 1 is a schematic diagram, in accordance with the present invention, of an arrangement for applying adhesive and reinforcing fibers to a tufted textile substrate to form a universal reinforcing backing layer 10. The reinforcing backing layer 10 is used for both broadloom and modular floor coverings. The floor covering illustrated in FIG. 1 includes a tufted textile substrate 12 made of yarns 14 that are tufted through a primary backing substrate 16 in a first direction. As is known, the primary backing substrate 16 and tufted textile substrate 12 have a face side and a back side that is opposite to the face side. The yarns 14 form stitches 18 on the back side of the primary backing substrate 16 and an interstitial space exists between each yarn 14. The reinforcing backing layer 10 contains an adhesive 20 and a plurality of fibers 22 encased by the adhesive 20 for producing a continuous fiber layer 24 on the back side of the tufted textile substrate 12.

The tufted textile substrate 12 is moved relative to an applicator 26 as schematically shown in FIG. 1. A composition, including a mixture of adhesive 20 and reinforcement fibers 22, is moved into a space between the stitches 18 and the applicator 26. Pressure is applied in a controlled manner between the applicator 26 and tufted textile substrate for moving the adhesive and fiber composition in a second direction that is toward the back side of the primary backing substrate 16.

During the controlled movement of the tufted textile substrate 12 in a first direction, i.e., the machine direction, and the controlled application of pressure by the applicator 26, the fibers 22 align with each other into a reinforcement layer of fibers 24 that is substantially parallel to the first or machine direction. Contemporaneous with the controlled movement of the substrate 12 and the application of pressure by applicator 26, an in situ filtration of the composition of adhesive and fibers occurs wherein the adhesive 20 is separated from the fibers 22 such that the adhesive is directed into the interstitial spaces between the yarns 14. The fibers 22 are prevented from penetrating into the interstitial spaces and the fibers 22 are laminated together by adhesive to form a wet-laid continuous overlapping reinforcement layer 24 of fibers that is substantially parallel to the first direction. After curing, the reinforcement layer of fibers and separated adhesive provides dimensional stability to the entire floor covering.

Figure 2:
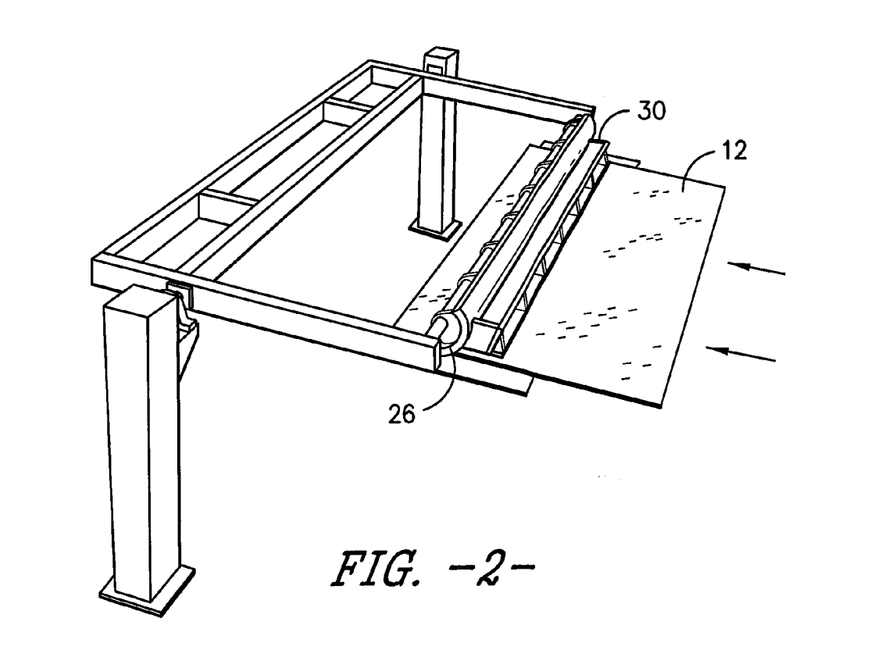
FIG. 2 is a partial perspective view of an applicator and movable tufted textile substrate operating to produce the inventive floor covering products described herein.

FIG. 2 is a partial view of an arrangement for applying adhesive and reinforcement fibers to a tufted textile substrate to form a universal reinforcement backing that may be used for broadloom and modular floor coverings. The tufted textile substrate 12 is moved in a first or machine direction by a belt 28 (FIG. 3) such that the tufted textile substrate 12 comes in contact with a composition or mixture of adhesive 20 and reinforcement fibers 22 that are located within a housing 30.

Figure 3:
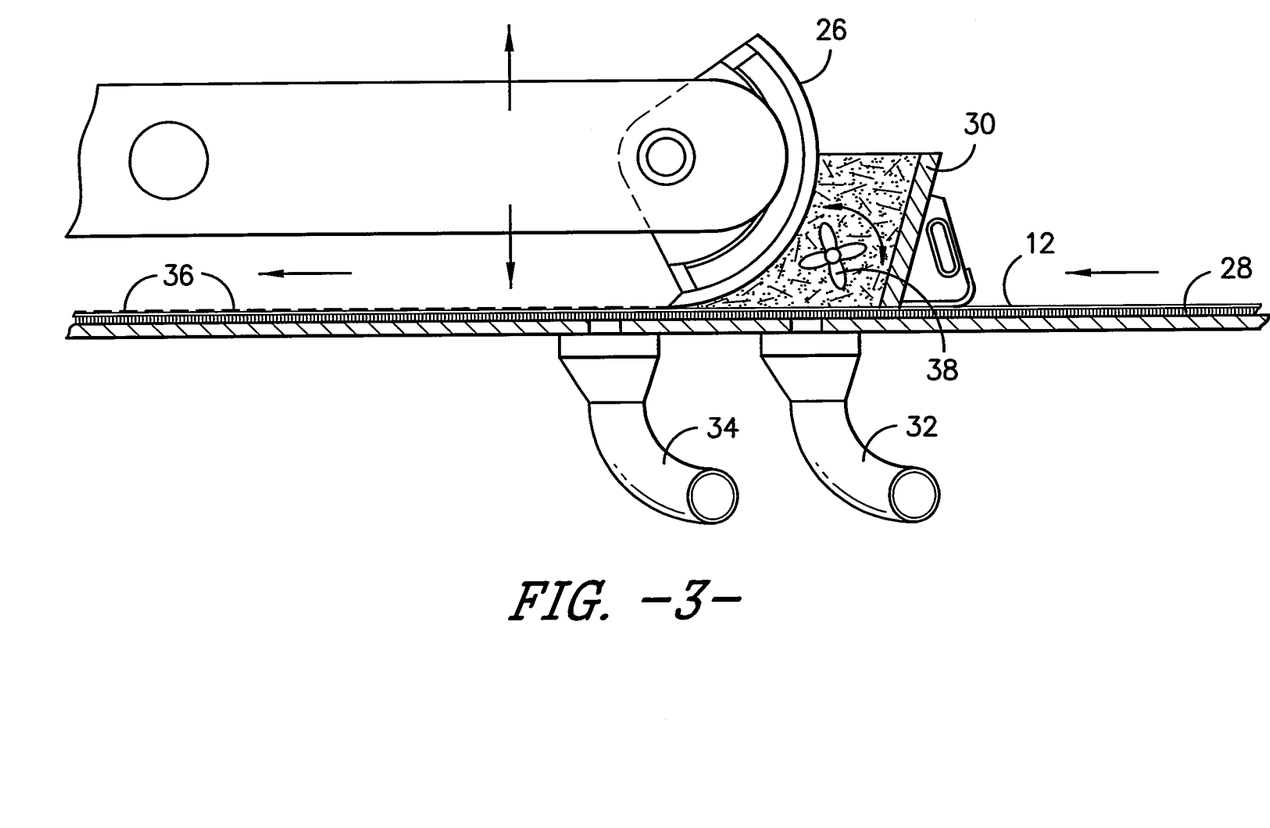
FIG. 3 is a cross sectional view of FIG. 2 illustrating the use of one or more vacuums and the mixing of the adhesive and reinforcement fiber composition.

In accordance with the present invention and as shown in FIG. 3, a vacuum tube 32 is positioned to apply vacuum on the face side of the tufted textile substrate 12 and primary backing substrate 16 before applying pressure in a controlled manner between the applicator 26 and tufted textile substrate 12. The use of vacuum 32 assists in causing the adhesive and fiber composition to move in a direction that is toward the back side of the primary backing substrate 16. Application of a vacuum during movement of the textile substrate and before applying pressure with applicator 26 also assists in the alignment and positioning of the reinforcement fibers before the filtration of the fibers 22 from the adhesive 20. The application of vacuum before applying pressure also helps to hold the fibers securely relative to each other and the stitches 18 for preventing slippage of the fibers and for aiding in the formation of the non woven reinforcement layer of fibers 24.

Figure 3A:
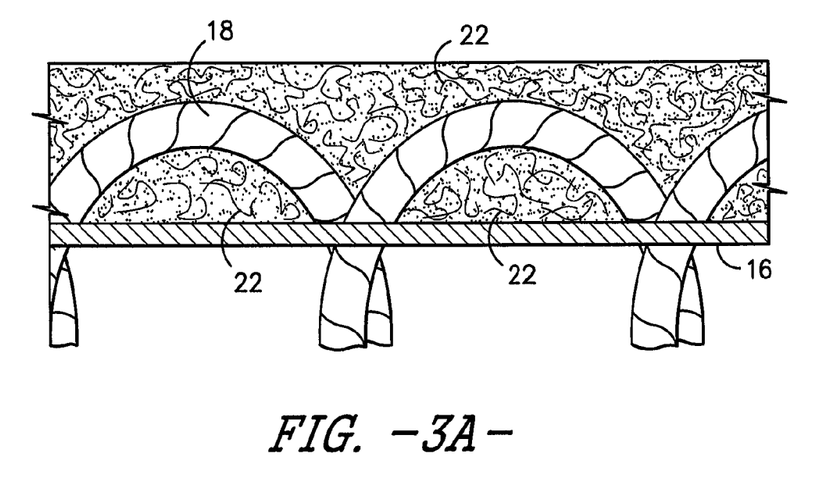
FIG. 3A is a close up schematic diagram of a small cross sectional portion of the primary backing substrate, stitches, and fibers, after the use of the first vacuum in FIG. 3, wherein the vacuum operates at a high level of controlled vacuum for causing the movement of fibers into the spaces between the stitch portions before the applicator applies pressure toward the tufted textile substrate.

FIG. 3A is a close up view of a small cross sectional portion of the primary backing substrate 16, stitches 18, and fibers 22 when a high level of controlled vacuum is drawn through the vacuum tube 32 for causing the movement of fibers 22 into the spaces between the stitch portions 18 before the applicator 26 applies pressure toward the primary backing substrate 16. In certain carpeting specifications, it may be desirable to have strength from fibers in the spaces between the stitch portions that is complimentary to or independent of the reinforcement: layer of fibers 24 in the machine direction which alone, as described previously, provides dimensional stability to the entire floor covering.

Depending on the amount of vacuum and the operational positioning between the vacuum tube 32 and applicator 26, the amount of fibers 22 and the final movement locations of the fibers 22 in the spaces between the stitch portions 18 can be controlled to. for example, cause a layer of fibers to be formed to engage the primary backing substrate 16 if desired for additional strength. Thus, FIG. 3B is only one configuration of the fibers 22 that results depending on the amount and time of vacuum as well as the operational positioning of the vacuum tube 32 and applicator 26.

Figure 3B:
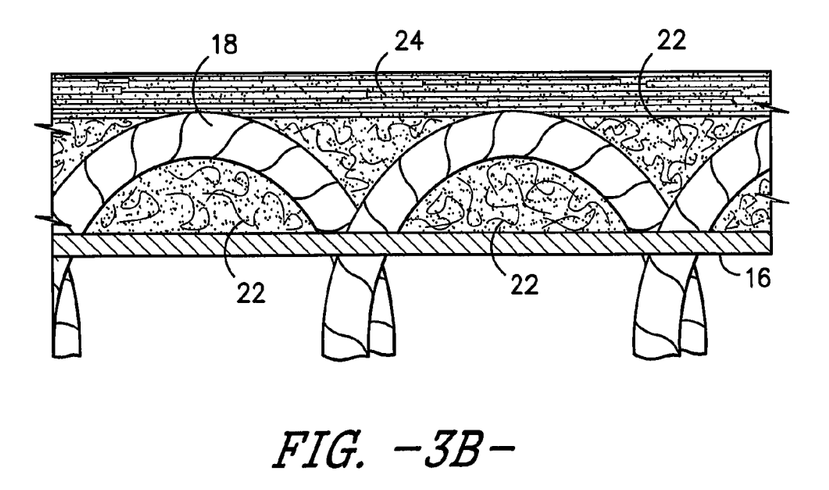
FIG. 3B is a close up schematic diagram of the small cross sectional portion of the primary backing substrate, stitches, fibers, and fiber reinforcement layer, after the use of the first vacuum at a high level of controlled vacuum and after applying pressure in a controlled manner between the applicator and the tufted exile substrate.

FIG. 3B is a close up view of the primary backing substrate 16, stitches 18, fibers 22, and fiber reinforcement layer 24 after the use of a high level of controlled vacuum for causing the movement of fibers 22 into the spaces between the stitch portions 18 and also after applying pressure in a controlled manner between the applicator 26 and backing substrate 16. As shown in the embodiment of FIG. 3B, the fiber reinforcement layer 24 encapsulates fibers 22 within the spaces between the stitch portions 18. The amount of pressure and movement applied by applicator 26 toward the primary backing substrate 16 controls the position and orientation of fibers 22 in the spaces between stitch portions 18, The equipment and operational construction illustrated and described in connection with FIGS. 3A and 3B provides for independent and/or combined movement and location of fibers 22 into the spaces between the stitch portions and/or formation of a fiber layer engaging the stitch portions.

Figure 4A:
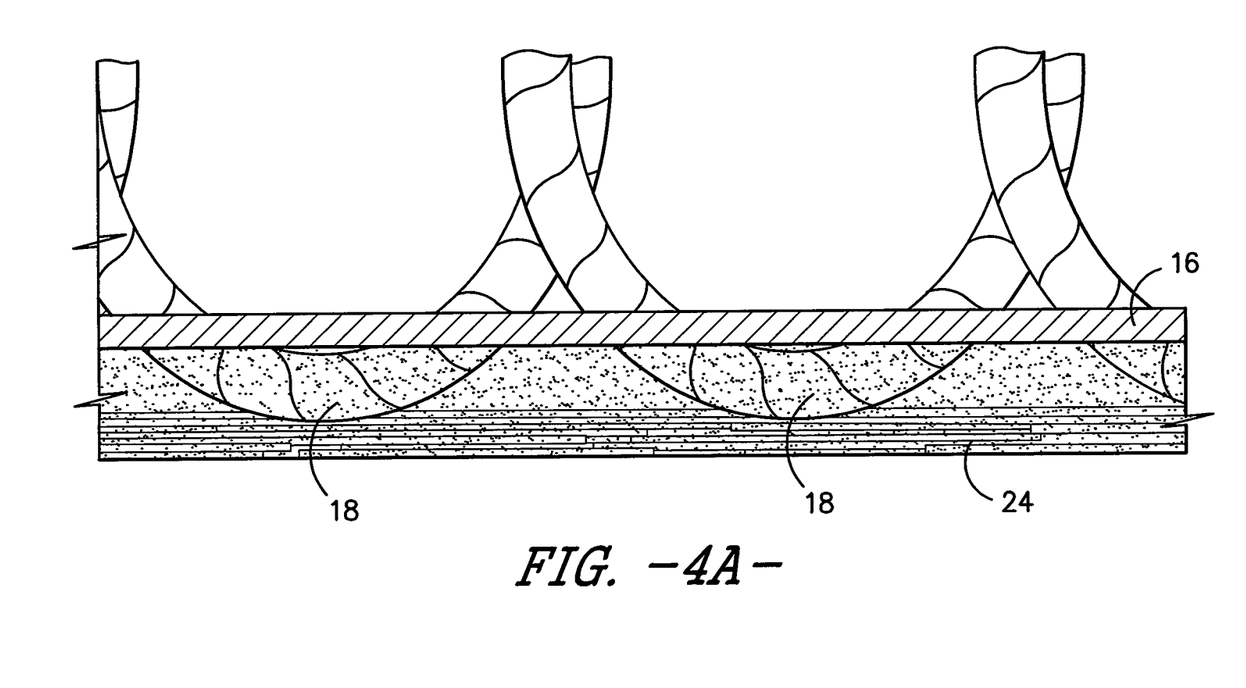
FIG. 4A is a close up schematic diagram of a small cross sectional portion of the primary backing substrate, stitches, and fiber reinforcement layer, after the use of a first vacuum in FIG. 3 and after applying pressure in a controlled manner between the applicator and the tufted textile substrate in FIG. 3.

The primary backing substrate 16 is porous and the yarns penetrate the backing substrate 16 to increase the porosity of the backing substrate. This porosity allows the vacuum on the face side of the backing substrate 16 to cause adhesive 20 to completely penetrate the space between the substrate 16 and the fiber layer 24, including penetration within the stitches 18. FIG. 4A shows the penetration of adhesive 20 into the space between the substrate 16 and fiber layer 24. It is also advantageous for the vacuum to be selectively controlled such that the primary backing substrate 16 receives a controlled amount of adhesive as well. For example, the vacuum can be controlled such that a polyester non-woven primary backing substrate may have within it, as a result of the vacuum, a layer of adhesive that is approximately 25% of the thickness of the backing substrate whereas a polypropylene woven primary backing substrate may have within it, as a result of the vacuum, a layer of adhesive that is approximately 5% of the thickness of the backing substrate. An adhesive layer being formed in the primary backing substrate 16 by the vacuum adds strength to the primary backing substrate 16 and bonds the yarns 14 together for improved quality.

Figure 4B:
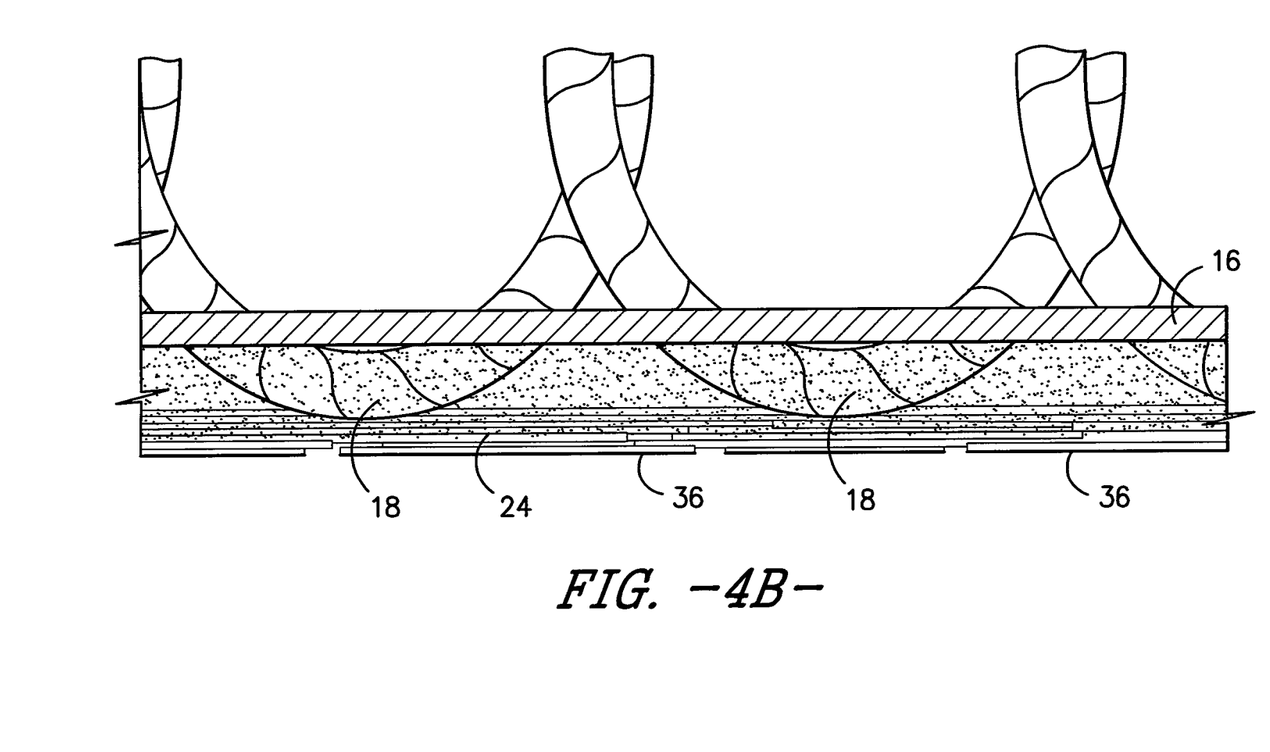
FIG. 4B is a close up schematic diagram of a small cross sectional portion of the primary backing substrate, stitches, and fiber reinforcement layer, after the use of a second vacuum in FIG. 3 and after applying pressure in a controlled manner between the applicator and the tufted textile substrate in FIG. 3.
Figure 5:
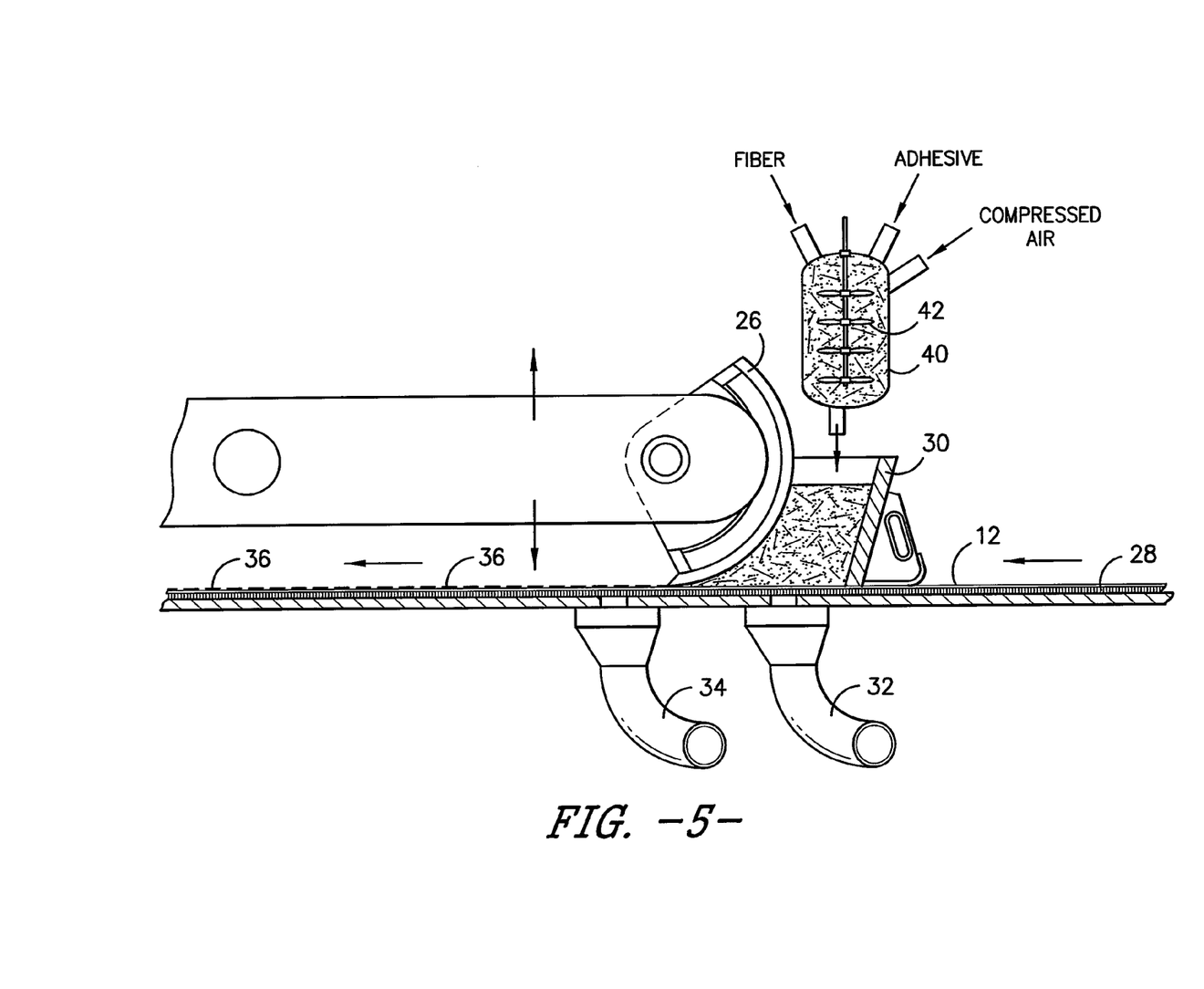
FIG. 5 is a cross sectional view of FIG. 2 illustrating the use of one or more vacuums and the injection of compressed air into the mixing of the adhesive and reinforcement fiber composition.

Another vacuum tube 34 is illustrated in FIG. 3 for applying a vacuum on the face side of the tufted textile substrate 12 and primary backing substrate 16. The vacuum through tube 34 occurs after applying pressure in a controlled manner between the applicator 26 and the tufted textile substrate 12. After applying a vacuum through vacuum tube 32 and the controlled application of pressure by applicator 26, the fiber layer 24 is substantially devoid of adhesive except for the fibers that are encased with adhesive to laminate the reinforcement layer of fibers together. As shown in FIGS. 3, 4B, and 5, applying additional vacuum through tube 34 causes the formation of bond sites 36. The bond sites 36 allow for mechanical attachment and/or bonding with other layers of materials such as thermoplastics.

As shown in FIG. 3, a mixer 38 is positioned in the composition of adhesive 20 and reinforcement fibers 22 to provide mixing of the adhesive and fibers either before and/or during the application of a vacuum through tube 32. The mixing of the adhesive and fibers prevents flocculation of the reinforcement fibers 22 which allows the fibers 22 to be better positioned by the vacuum as previously described.

FIG. 5 illustrates another aspect of the present invention wherein a mixing chamber 40 is provided, which includes a mixer 42 that mixes the fibers 22 and adhesive 20 together with injected compressed air. The injection of compressed air into the adhesive/fiber mixture provides spaces between the individual fibers as they progress from the mixing chamber 40 and housing 30 and the space between the applicator 26 and stitch portions 18 of the yarns 14. The injection of air also prevents flocculation and assists in distributing the fibers in a more uniform formation of the reinforcement layer of fibers 24. Another advantage from the injection of air is the increase in viscosity of the adhesive which enhances the formation of the fibers as a layer during the previously described filtering process.

Figure 6:
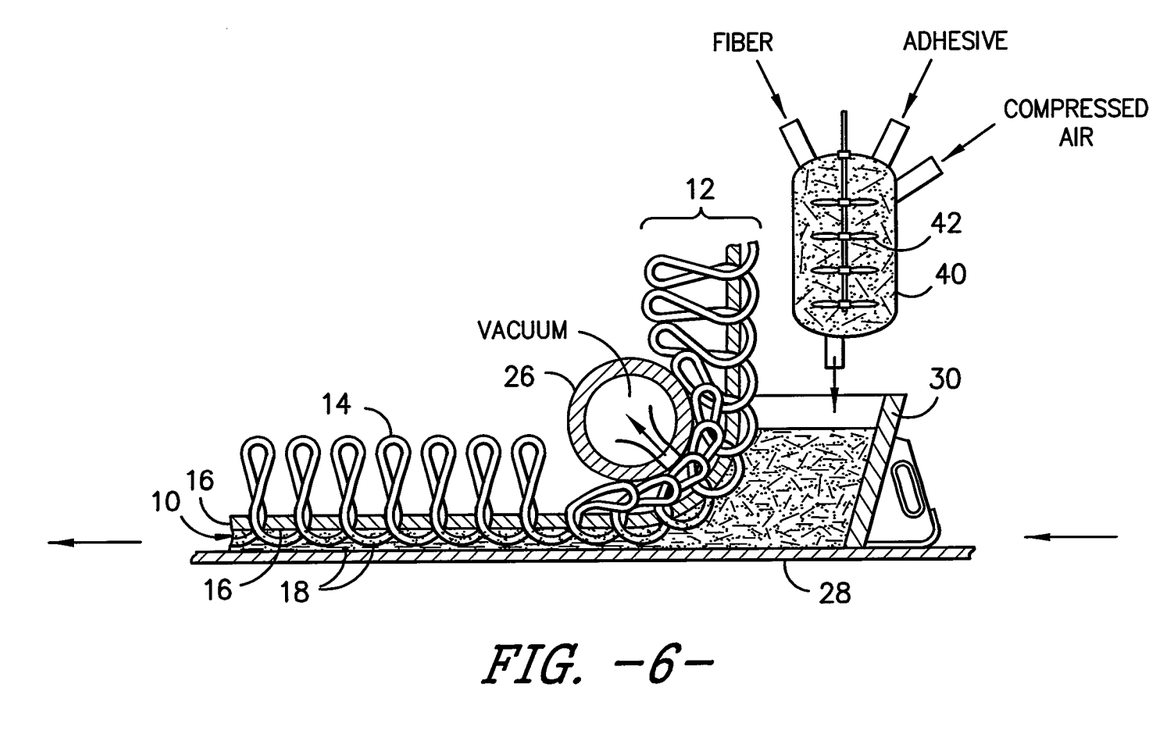
FIG. 6 is a schematic diagram of an equipment arrangement for applying an adhesive layer and reinforcing fibers to a tufted textile substrate, the use of a vacuum, and the injection of compressed air into the mixing of the adhesive and reinforcement fiber composition, as may be used in the production of the inventive floor covering products described herein.
Figure 6A:
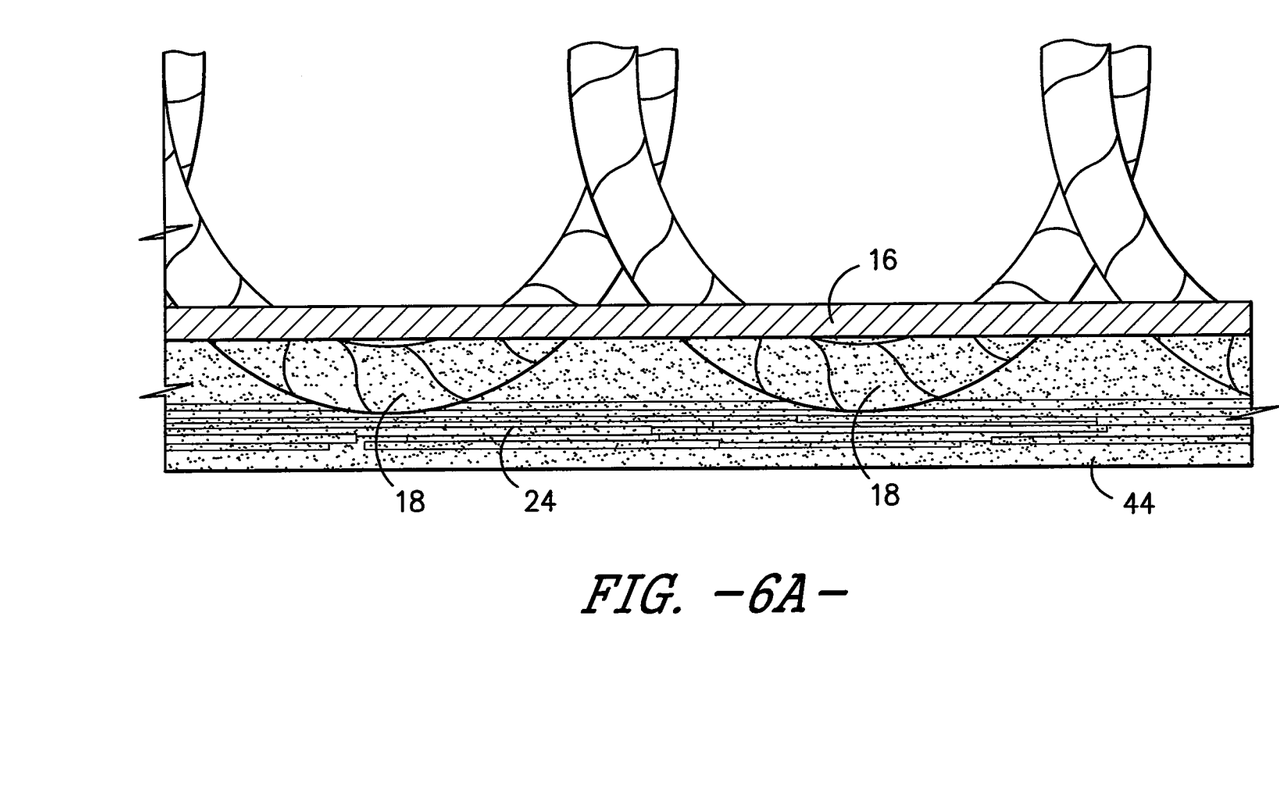
FIG. 6A is a close up schematic diagram of a small cross sectional portion of the primary backing substrate, stitches, and fiber reinforcement layer, after the use of the vacuum in FIG. 6 and after applying pressure in a controlled manner between the applicator and the tufted textile substrate in FIG. 6.

FIGS. 6 and 6A illustrate another embodiment of the present invention wherein the applicator 26 both contacts and applies pressure to the tufted textile substrate 12 and provides a vacuum which is directed through the primary backing substrate 16. The vacuum from the applicator 26 occurs at the same time the applicator 26 is applying controlled pressure toward the primary backing substrate 16. In this embodiment of the invention, the composition of adhesive 20 and fibers 22 is pushed or forced to move toward the back side of the primary backing substrate 16 as previously disclosed. Further, the fibers 22 are aligned to lay predominantly in the machine direction during the application of pressure by the applicator 26 and movement of the tufted textile substrate 12 for forming a layer of fibers 24 that is substantially parallel to the machine direction. Moreover, in situ filtration of the adhesive/fiber composition occurs such that adhesive is pulled by the vacuum into the space between the primary backing substrate 16 and stitch portions 18.

While the carpet is moving relative to the applicator 26 in FIG. 6, a thin layer 44 (FIG. 6A) of adhesive forms on the reinforcement layer of fibers 24. Because of the configuration of the applicator 26 and vacuum, as shown in FIG. 6, and the position of engagement of the applicator 26 with the yarns 14, a reinforcement layer of fibers 24 is formed which is engaged on one side by the stitch portions 18 as previously disclosed. In addition, a thin layer 44 of only adhesive is formed on the opposite side of the reinforcement layer of fibers 24 as shown in FIG. 6A. The thin layer 44 of adhesive prevents the need to cover the otherwise exposed surface of the reinforcement layer 24 with any other type of adhesive such as polyethylene, PVC, or foam.

In the embodiment of the invention in FIG. 1, the applicator 26 is in engagement with the pool of adhesive 20 and fibers 22, whereas in the embodiment of the invention in FIG. 6-6A, the applicator 26 is only in engagement with the yarns 14. Both embodiments move the tufted textile substrate 12 relative to the applicator 26 and provide a space between the stitch portions 18 and the applicator 26; both embodiments provide a pool of adhesive 20 and fibers 22; both embodiments apply pressure in a controlled manner between the applicator 26 and tufted textile substrate 12 for pushing the adhesive 20 and fibers 22 toward the back side of the primary backing substrate 16; both embodiments align the fibers 22 to lay predominantly in the machine direction during the application of pressure and movement of the tufted textile substrate 12 such that the fibers 22 are aligned to be substantially parallel to the machine direction; and both embodiments provide in situ filtration of the adhesive/fiber composition for pushing the adhesive away from the reinforcement fibers and for pushing adhesive into the interstitial spaces between the yarns 14. Both embodiments of the invention also provide a vacuum to move adhesive into the stitch portions of the yarns and into the back side of the primary backing substrate to provide enhanced dimensional stability. Further, both embodiments provide mixing of the adhesive/fiber composition and/or injection of compressed air into the adhesive/fiber composition to assist in preparing the adhesive and fiber composition to be in the preferred condition before the application of pressure. While there are no differences in the functionality of the embodiments illustrated in FIG. 1 and FIGS. 6 and 6A, the physical arrangement difference for applicator 26 and the vacuum in FIG. 1, as compared to FIGS. 6-6A, results in the additional advantageous formation of thin adhesive layer 44 which eliminates the possible need to cover the otherwise exposed surface of the reinforcement layer 24 after curing.

The vacuum applicator disclosed in FIG. 6 may also be used with only a pool of adhesive 20 that does not include fibers 22. When used in this fashion, the vacuum would be directed through the porous primary backing substrate 16 to cause adhesive 20 to penetrate the interstitial spaces between each yarn 14 as well as into the stitches 18. The vacuum may be controlled such that the primary backing substrate 16 also receives a controlled amount of adhesive as described previously. Thus, the applicator 26 in FIG. 6 is flexible such that it may be used with adhesive 20 alone or in combination with fibers 22.

As stated previously, in each of the embodiments of the invention, the applicator 26 applies sufficient pressure in a controlled manner to move the adhesive 20 and fiber 22 composition in a direction that is toward the back side of the primary backing substrate 16. The amount of pressure or compression that is applied by the applicator 26 depends on the configuration of the applicator 26, the line speed of the reinforcing backing layer 10, the viscosity of the adhesive 20, and the diameter/weight of the fibers 22. The applicator pressure is sufficient to move the adhesive 20 into the interstitial spaces between each yarn 14 and, if desired, into the stitches 18 on the backside of the primary backing substrate 16, as shown in FIGS. 4A, 4B, and 6A. The amount of pressure or compression that is applied by the applicator 26 is also sufficient to remove the adhesive 20 from the fiber layer 24 except for that needed to provide lamination of the fiber layer 24. FIGS. 3 and 5 as well as FIG. 6 illustrate applicator 26 constructions for controlling the applicator pressure such that it is sufficient to move the adhesive 20 into the interstitial spaces between each yarn 14 and into the stitches 18. In FIGS. 3 and 5, the pivotal applicator 26 has a crescent or partial circle shape on one end and counter weights (not shown) on the other end. The counter weights can be removed or added depending on the amount of pressure that is applied by the applicator 26 to control the movement of the adhesive 20 and fiber 22 composition in the direction toward the back side of the backing substrate 16. FIG. 6 illustrates an applicator 26, that also includes vacuum, such that the applicator applies controlled pressure and the vacuum assists in the formation of layer 44 (FIG. 6A) as previously described.

The embodiments of the floor covering disclosed in FIGS. 1-6A may be recycled such that only the cleaned tufted carpet and loose reinforcement fibers remain. A floor covering made in accordance with the invention may be conveyed through a steam chamber in which the floor covering is exposed to steam for dissolving the adhesive composition. This will allow the tufted carpet, reinforcement fibers, and adhesive to be separated from each other and recycled.

Figure 7:
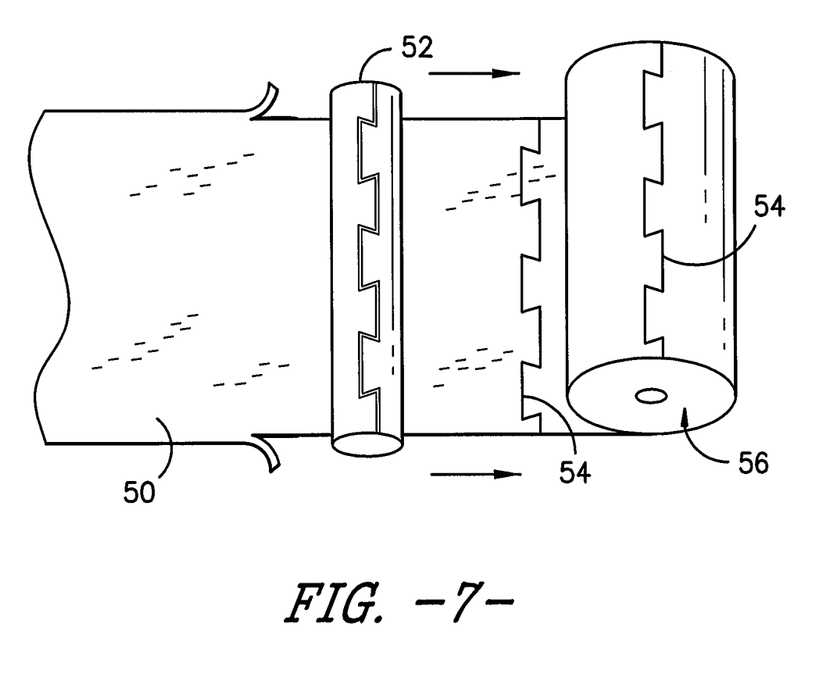
FIG. 7 is a schematic diagram of one embodiment of the equipment arrangement for cutting and rolling the universal floor covering described herein.
Figure 8A:
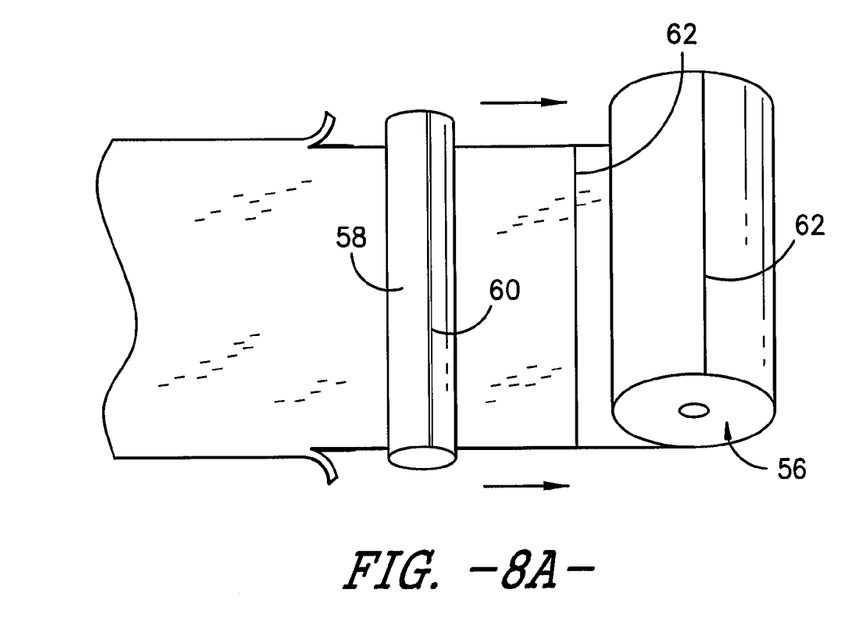
FIG. 8A is a schematic diagram of another embodiment of the equipment arrangement for cutting and rolling the universal floor covering described herein.
Figure 8B:
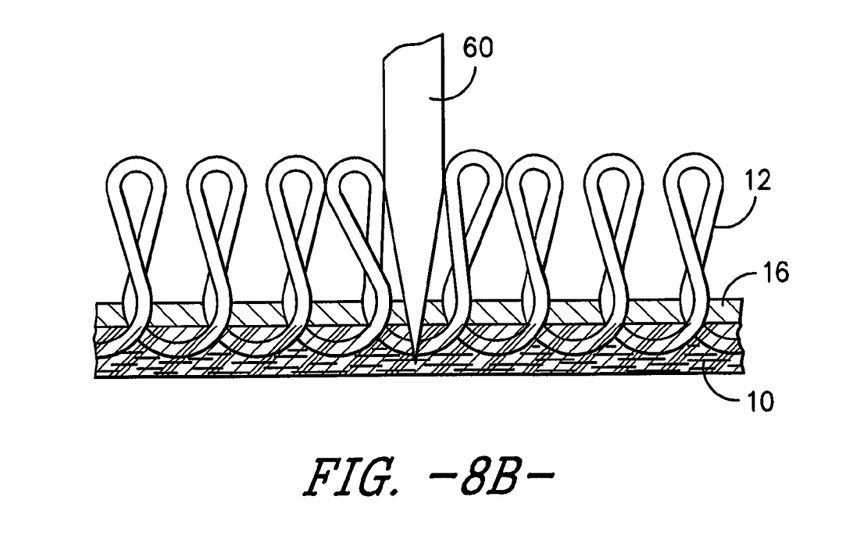
FIG. 8B is a partial cross sectional diagram of the embodiment of the equipment arrangement for cutting and rolling the universal floor covering that is shown in FIG. 8A.

FIGS. 7, 8A, and 8B illustrate two embodiments of the equipment arrangement for cutting and rolling the universal floor covering 50 described previously. Referring to the first embodiment In FIG. 7, the universal floor covering 50, including tufted textile substrate 12 and backing layer 10, is periodically and selectively cut by a locking pattern cutting roll 52 for forming multiple locking patterns 54 at designed intervals along the length of the universal floor covering roll 56. For modular carpeting, the locking pattern 54 allows the modular carpeting to be placed onto a roll for shipping and installation as a continuous yet segmented modular carpet. Modular carpeting is currently cut with a stop and go motion and the individual modular squares are handled as individual units. These modular units must be separately boxed and subsequently palletized for shipment and installation. The ability to roll modular carpeting, as a continuous yet segmented modular carpet, is a substantial benefit over the known modular carpeting process of cutting separate modular squares that are boxed for shipment and installation.

FIGS. 8A and 8B illustrate another embodiment of the equipment arrangement for cutting and rolling the universal floor covering 50. In this, embodiment, the universal floor covering 50 is periodically cut by the cutting roll 58 that has a cutting blade 60 for making multiple cuts 62 along the length of the universal floor covering roll 56. As shown in FIG. 8B, the cutting blade 60 does not penetrate the backing layer 10. This embodiment, like the one shown in FIG. 7, allows the carpeting to be placed onto a roll for shipping and installation as a continuous yet segmented carpet.

The equipment and operational techniques provided by the example embodiments in FIGS. 7, 8A, and 8B are applicable to both the broadloom and modular universal carpeting of the present invention. The designed cutting and rolling of each roll of the universal floor covering 50, as described herein, allows for both broadloom and modular carpeting to be shipped on the same roll. With respect to modular carpeting, the illustrated cutting and rolling techniques insure a matched modular being placed next to its manufacturing counterpart because the modules are not separated. The programming used for the designed cutting and rolling of the universal floor covering section may also be used for cutting and rolling any other layer that lies under the universal floor covering thereby insuring a size match between the universal section and the underlying layer.

The dimensionally stable floor covering disclosed herein possesses sufficient stability and flexibility to permit installation without the need for traditional stretching or the use of traditional permanent flooring attachments such as tack strips or adhesive. This simplifies the installation and reduces the time and cost required for installation. The universal floor covering disclosed herein may be provided with a layer such as a high coefficient of friction backing layer. Examples of a high coefficient of friction backing include acrylic or natural latex. With the present invention, it is only necessary to measure the floor covering to fit the dimension of the room in which the floor covering is to be installed and then lay the floor covering into the room.

As described previously with respect to FIGS. 7, 8A, and 8B, another layer, such as a cushion layer, can be programmably cut and rolled to match the designed cutting and rolling of the universal floor covering sections to ensure a size match between the universal carpet sections and the underlying layer. Alternatively, an additional layer, such as layer 44 in FIG. 6A, can be applied during the manufacturing process so that the universal floor covering already includes a cushion or friction layer before it is rolled. Thus, the dimensionally stable floor covering of the present invention substantially reduces the costs associated with manufacturing, shipping, and installation as compared to conventional floor coverings.

Based upon the foregoing description of the invention, certain manufacturing steps are needed to produce the desired dimensionally stable universal floor covering for a specific application. Since the floor covering disclosed herein may be used for all broadloom or modular products, the materials to be used for the tufting yarn 14, primary backing substrate 16, reinforcement fibers 22, and adhesive 20 are designed and selected by taking into account the desired characteristics for either the broadloom or modular carpeting that will be manufactured and installed. For example, the viscosity of adhesive 20 is selected to ensure the desired strength and amount of penetration into the primary backing substrate 16 as described previously. Further, the length and diameter of the fibers 22 are chosen depending on the desired strength of the floor covering. Moreover, the tufting yarn 14 is primarily chosen for aesthetics and durability as well as the porosity and strength of the tuft stitches 18. The primary backing substrate 16 is also chosen for strength and porosity depending on the amount of penetration of adhesive 20 that is desired in the primary backing substrate 16.

As described previously, there are no functional or component differences in the universal backing layer 10 formed from the embodiments illustrated in FIGS. 3, 4A, 4B, 6 and 6A. The physical arrangement difference for the applicator 26 and the vacuum in FIG. 3, as compared to FIGS. 6-6A, results in other differences such as, for example, the formation of an adhesive layer 44 (FIG. 6A) before curing which eliminates the need to cover reinforcement layer 24 after curing, or the flexibility of using applicator 26 in FIG. 6 with adhesive 20 alone or in combination with fibers 22. Thus, a step in manufacturing the desired dimensionally stable universal floor covering for a specific application involves the selection of either the manufacturing arrangement illustrated in FIGS. 3, 4A, and 4B or the manufacturing arrangement illustrated in FIGS. 6 and 6A.

The use of vacuum, mixing, and injection of compressed air have been described in FIGS. 3-6A to assist in preparing the adhesive 20 and fiber 22 composition to be in the preferred condition and position before the application of pressure to form the reinforcement layer 24. The vacuum is used to help move adhesive 20 into the stitches 18 as well as the spaces between the stitches 18. The vacuum may also be used to move adhesive 20 into the back side of the primary backing substrate 16 to a selected depth. The mixing of fibers 22 and adhesive 20 occurs before in situ filtration of the adhesive 20 and fibers 22. Further, compressed air may be injected into the adhesive/fiber composition to provide spaces between the fibers 22 before application of pressure to the composition. The selection of the conditioning steps is made after the desired characteristics of the floor covering are known and the manufacturing arrangement has been selected.

After pre-conditioning of the adhesive 20 and fiber 22 composition to be in the preferred condition and position, the applicator 26 is controlled to apply pressure toward the back side of the primary backing substrate 16. Because of the frictional difference between the smooth surface of the applicator 26 and the fibrous texture of the stitches 18, the fibers 22 have a greater attraction toward the stitches 18 rather than the applicator 26. The increasing pressure from the applicator 26 and decreasing gap between the applicator 26 and stitches 18 results in the fibers 22 lying predominately in the machine direction to form a reinforcement layer of fibers, and the adhesive 20 being pushed toward the back side of the primary backing substrate 16 to form a layer of adhesive. The application of pressure by the applicator 26 is controlled to provide the desired thickness of the reinforcement layer of fibers and to move adhesive into the stitches 18, the spaces between the stitches 18, and into the back side of the primary backing substrate 16 if desired.

Since both broadloom and modular floor coverings can be manufactured, cut, installed, and recycled in the same way, including the same raw materials and manufacturing equipment, the foregoing steps for manufacturing, cutting, installing, and recycling are connected and made possible because of the present invention.

The present invention may be embodied in other forms without departing from the spirit and the essential attributes thereof, and, accordingly, reference should be made to the appended claims, rather than to the foregoing specification, as indicated the scope of the invention.

What is claimed is:

1. A method of manufacturing a universal floor covering which can be used as either a broadloom or modular floor covering, the method comprising the steps of:
   selectively manufacturing either a broadloom or modular floor covering from a group of design components including a tufted textile substrate having a primary backing substrate extending in a first direction and a plurality of yarns tufted through the primary backing substrate, the primary backing substrate having a face side and a back side opposite the face side, a portion of each yarn forming a stitch portion having an end that is located on the back side of the primary backing substrate, and an interstitial space existing between the ends of stitch portions;
   said group of design components further including a composition pool having a mixture of adhesive and reinforcement fibers, and said group of design components being collectively and individually designed to have desired performance characteristics;
   moving the tufted textile substrate relative to an applicator and providing space between the stitch portions of the yarns and the applicator;
   applying pressure in a controlled manner between the applicator and tufted textile substrate and forcing the adhesive and reinforcement fiber composition in a second direction that is toward the back side of the primary backing substrate;
   aligning the reinforcement fibers to lay predominantly in the first direction such that the reinforcement fibers form a reinforcement layer of fibers that is substantially parallel to the first direction for providing dimensional stability for the entire floor covering and for forming a universal floor covering that can be used as either a broadloom or modular floor covering;
   applying a vacuum to the composition pool before aligning the reinforcement fibers to lay predominantly in the first direction;
   curing the universal floor covering; and
   selectively cutting the universal floor covering depending on whether it is desired to install a broadloom or modular floor covering, and rolling the cut universal floor covering into a roll for shipment and installation.

2. The method of manufacturing a floor covering according to claim 1 further comprising selectively cutting the universal floor covering for forming multiple locking patterns at designated intervals along the length of the floor covering.

3. The method of manufacturing a floor covering according to claim 1 further comprising selectively cutting the universal floor covering at designated intervals along the length of the floor covering.

4. The method of manufacturing a floor covering according to claim 1 further comprising selectively operating the vacuum for causing the movement of fibers into the spaces between the stitch portions before applying pressure between the applicator and tufted textile substrate.

5. The method of manufacturing a floor covering according to claim 1 further comprising mixing the adhesive and reinforcement fibers before aligning the fibers to lay predominantly in the first direction.

6. The method of manufacturing a floor covering according to claim 1 further comprising forming a cushion or friction layer on the reinforcement layer of fibers before cutting the universal floor covering.

7. The method of manufacturing a floor covering according to claim 1 further comprising forming a cushion or friction roll the same length and width as the universal floor covering.

8. A method of manufacturing a universal floor covering which can be used as either a broadloom or modular floor covering, the method comprising the steps of:
   selectively manufacturing either a broadloom or modular universal floor covering from the same group of design components including a tufted textile substrate having a primary backing substrate extending in a first direction and a plurality of yarns tufted through the primary backing substrate, the primary backing substrate having a face side and a back side opposite the face side, a portion of each yarn forming a stitch portion having an end that is located on the back side of the primary backing substrate, and an interstitial space existing between the ends of stitch portions; and the characteristics of each design component, including a length of the fibers, a diameter of the fibers, a viscosity of the adhesive, a porosity of the fiber and the adhesive, being selected to meet desired performance characteristics;
   selecting an equipment arrangement for applying a pool of adhesive and reinforcement fibers to said tufted textile substrate;
   conditioning the adhesive and fibers to assist in preparing the adhesive and fibers to be in a desired condition and location in the pool of adhesive and fibers;
   moving the tufted textile substrate relative to an applicator and applying pressure in a controlled manner between the applicator and tufted textile substrate and forcing the adhesive and reinforcement fibers in a second direction that is toward the back side of the primary backing substrate;
   aligning the reinforcement fibers to predominantly lay in the first direction such that the reinforcement fibers form a reinforcement layer of fibers that is substantially parallel to the first direction for providing dimensional stability for the entire floor covering and for forming a universal floor covering that can be used as either a broadloom or modular floor covering;

applying a vacuum to the pool of adhesive and reinforcement fibers before completing the alignment of the reinforcement fibers;

curing the universal floor covering; and selectively cutting the universal floor covering depending on whether it is desired to have a roll of broadloom floor covering, a roll of modular floor covering, or a combination roll having both broadloom and modular floor coverings; and rolling the universal floor covering into a roll for shipment and installation.

9. The method of manufacturing a universal floor covering according to claim 8 further comprising using the vacuum to move fibers into the spaces between the stitch portions and applying pressure between the applicator and tufted textile substrate to form the layer of reinforcement fibers.

10. The method of manufacturing a universal floor covering according to claim 8 further comprising applying the vacuum to move adhesive into the back side of the primary backing substrate.

11. The method of manufacturing a universal floor covering according to claim 8 further comprising selectively mixing the pool of adhesive and reinforcement fibers, selectively injecting air into the pool of adhesive and reinforcement fibers, or selectively applying a vacuum to the pool of adhesive and reinforcement fibers.

12. The method of manufacturing a universal floor covering according to claim 8 wherein the equipment arrangement includes engaging the applicator with the pool of adhesive and reinforcement fibers or engaging the applicator with the tufted textile substrate, and wherein the applicator applies pressure in a controlled manner for causing the adhesive and reinforcement fibers to move toward the backside of the primary facing substrate.

13. The method of manufacturing a universal floor covering according to claim 8 further comprising selectively cutting the universal floor covering by forming multiple locking patterns at designated intervals along the length of the floor covering or by cutting the universal floor covering at designated intervals along the length of the floor covering.

14. The method of manufacturing a universal floor covering according to claim 13 further comprising providing at least one cushion or friction layer on the reinforcement layer of fibers, said layer is formed and cut either with the cutting of the universal floor covering or said layer is formed and cut from a cushion or friction roll to match the cuts on the universal floor covering.

15. The method of manufacturing a universal floor covering according to claim 8 wherein the adhesive is dissolvable for allowing recycling of the floor covering when necessary by dissolving the adhesive between the reinforcement layer of fibers and the backing substrate for allowing the yarns, textile substrate, reinforcement fibers, and adhesive to be separated and recycled.

* * * * *